US010065892B2

(12) United States Patent
Kim et al.

(10) Patent No.: US 10,065,892 B2
(45) Date of Patent: Sep. 4, 2018

(54) HYDRAULIC BINDER COMPOSITION USING RAPIDLY-COOLED STEELMAKING REDUCED SLAG POWDER, AND METHOD OF PREPARING THE SAME

(71) Applicant: KONGJU NATIONAL UNIVERSITY INDUSTRY-UNIVERSITY COOPERATION FOUNDATION, Gongju-si, Chungcheongnam-do (KR)

(72) Inventors: Jin-Man Kim, Daejeon (KR); Sun-Mi Choi, Sejong (KR); Ji-Ho Kim, Jeollanam-do (KR)

(73) Assignee: Jin-Man Kim (KR)

( * ) Notice: Subject to any disclaimer, the term of this patent is extended or adjusted under 35 U.S.C. 154(b) by 57 days.

(21) Appl. No.: 14/604,874

(22) Filed: Jan. 26, 2015

(65) Prior Publication Data

US 2015/0152009 A1   Jun. 4, 2015

Related U.S. Application Data

(63) Continuation of application No. PCT/KR2012/010680, filed on Dec. 10, 2012.

(30) Foreign Application Priority Data

Jul. 25, 2012   (KR) .......................... 10-2012-0081388

(51) Int. Cl.
*C04B 28/14*   (2006.01)
*C04B 5/00*   (2006.01)
*C21B 3/08*   (2006.01)

(52) U.S. Cl.
CPC ............... *C04B 28/14* (2013.01); *C04B 5/00* (2013.01); *C21B 3/08* (2013.01)

(58) Field of Classification Search
CPC .. C04B 7/14; C04B 5/00; C04B 28/14; C21B 3/08
See application file for complete search history.

(56) References Cited

U.S. PATENT DOCUMENTS

| | | | | |
|---|---|---|---|---|
| 4,328,039 A | * | 5/1982 | Masuda | C04B 28/08 106/715 |
| 4,756,761 A | * | 7/1988 | Philip | C04B 5/06 106/707 |
| 5,273,579 A | * | 12/1993 | Tanaka | C04B 7/21 106/715 |
| 5,494,515 A | * | 2/1996 | Young | C04B 7/17 106/745 |
| 8,834,625 B2 | * | 9/2014 | Kim | C04B 7/21 106/782 |
| 8,986,444 B2 | * | 3/2015 | Robl | C04B 7/323 106/693 |

FOREIGN PATENT DOCUMENTS

| | | |
|---|---|---|
| GB | 821741 | * 10/1959 |
| JP | 52-130819 A | 11/1977 |
| JP | 63-285114 A | 11/1988 |
| JP | 64-37450 A | 2/1989 |
| JP | 05-294701 A | 11/1993 |
| JP | 08-143348 A | 6/1996 |
| JP | 2007-197286 A | 8/2007 |
| JP | 2008-179504 A | 8/2008 |
| KR | 76-397 A | 9/1976 |
| KR | 90-33 B1 | 1/1990 |
| KR | 97-008685 B1 | 5/1997 |
| KR | 10-0220340 B1 | 6/1999 |
| KR | 10-0310657 B1 | 9/2001 |
| KR | 10-0670458 B1 | 1/2007 |
| KR | 10-0755272 B1 | 8/2007 |
| KR | 10-2012-0050329 A | 5/2012 |

OTHER PUBLICATIONS

JP 406321607 A (Tanaka et al.) Nov. 22, 1994 abstract.*
JP 406321607 A (Tanaka et al.) Nov. 22, 1994 Machine Translation into English.*
Korean Office Action(KR 10-2012-0081388), KIPO, dated Dec. 27, 2012.
International Search Report(PCT/KR2012/010680), WIPO, dated Apr. 29, 2013.

* cited by examiner

*Primary Examiner* — Anthony J Green
(74) *Attorney, Agent, or Firm* — Park & Associates IP Law, P.C.

(57) ABSTRACT

Disclosed are a hydraulic binder composition using rapidly-cooled steelmaking reduced slag powder and a method of preparing the same. More particularly, the rapidly-cooled steelmaking reduced slag (RC-LFS) powder is obtained by spraying and scattering gas at a high pressure and high speed onto electric furnace smelting reduction slag, which is one of the by-products generated during iron smelting performed in an ironworks, and quickly cooling and pulverizing the slag. The initial high hydration heat reaction and initial setting of the rapidly-cooled steelmaking reduced slag (RC-LFS) powder are delayed to ensure workability. A retardant and gypsum are mixed into the rapidly-cooled steelmaking reduced slag (RC-LFS) powder so as to activate the generation of needle-shaped ettringite and to thus develop the initial and long-term strength, and therefore the rapidly-cooled steelmaking reduced slag (RC-LFS) powder of the present invention can be used as a substitute for ordinary Portland cement.

1 Claim, 17 Drawing Sheets

FIG. 18
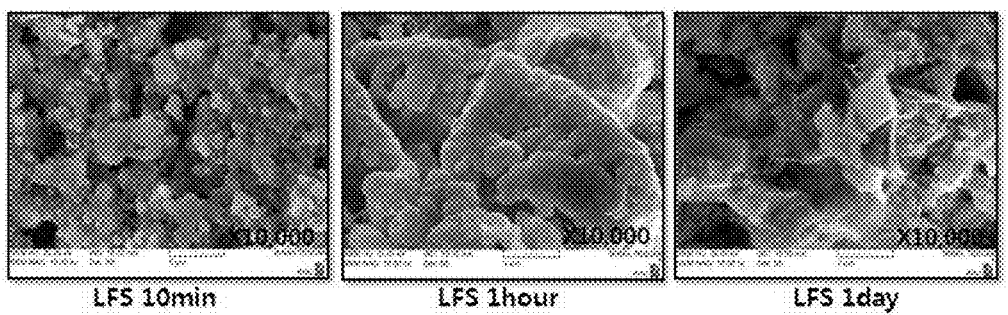
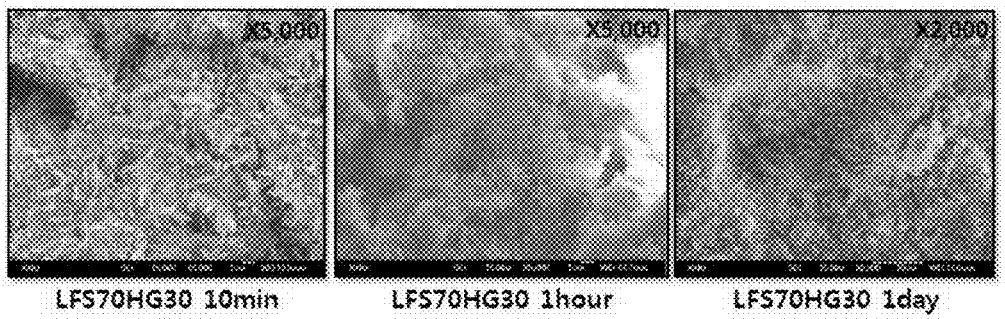

US 10,065,892 B2

HYDRAULIC BINDER COMPOSITION USING RAPIDLY-COOLED STEELMAKING REDUCED SLAG POWDER, AND METHOD OF PREPARING THE SAME

REFERENCE TO RELATED APPLICATIONS

This is a continuation of pending International Patent Application PCT/KR2012/010680 filed on Dec. 10, 2012, which designates the United States and claims priority of Korean Patent Application No. 10-2012-0081388 filed on Jul. 25, 2012, the entire contents of which are incorporated herein by reference.

FIELD OF THE INVENTION

The present invention relates to a hydraulic binder composition using a rapidly-cooled steelmaking reduction slag powder and a method of preparing the same. More particularly, the rapidly-cooled steelmaking reduction slag (RC-LFS) powder is obtained by spraying and scattering gas at a high pressure and high speed onto electric furnace smelting reduction slag, which is one of the by-products generated during iron smelting performed in an ironworks, and quickly cooling and pulverizing the slag. The initial high hydration heat reaction and initial setting of the rapidly-cooled steelmaking reduction slag (RC-LFS) powder are delayed to ensure workability. A retardant and gypsum are mixed into the rapidly-cooled steelmaking reduction slag (RC-LFS) powder so as to activate the generation of needle-shaped Ettringite and to thus develop the initial and long-term strength, and therefore the rapidly-cooled steelmaking reduction slag (RC-LFS) powder of the present invention can be used as a substitute for ordinary Portland cement.

BACKGROUND OF THE INVENTION

Steelmaking slag, which is separated by gravity difference, is lighter than iron and contains almost no heavy metals. Accordingly, steelmaking slag is less harmful and thus there is relatively active research into steelmaking slag to use as materials for construction. However, steelmaking slag contains free-CaO and thus volume thereof expands by chemical reaction occurring upon contact with water. Accordingly, cracks may occur when steelmaking slag is used as a material for road construction or concrete, thereby extremely limiting application thereof.

To commonly use steelmaking slag, a method of controlling a generation amount of free-CaO was developed and commonly used as a method to rapidly cool steelmaking slag at a molten state, using high-speed air. The steelmaking slag is also called atomizing steelmaking slag (ASS), since steelmaking slag produced according to the method has a globular shape. In addition, the steelmaking slag is called rapidly-cooled steelmaking slag (RCSS) since the steelmaking slag is prepared according to a rapid cooling process. In addition, steelmaking slag is commonly called as precious slag balls (PS ball).

PS balls do not contain free-CaO, thereby liminating any risk of collapse due to expansion. In addition, since PS balls have a fine aggregate shape similar to a globular shape, liquidity increases by ball bearing effects when used as a construction material for concrete. Furthermore, PS balls have higher density than other materials constituting concrete and, thus, attempts have been made to utilize PS balls in various use as road packing, weight balancing materials, and the like.

Meanwhile, general cement and cement products harden at a time point of 24 hours and then reach peak strength at the material age of 28 day. Like this, overall characteristics of general cement and cement products are exhibited from the material age and thereby quick-hardening cement and products using the same are used in emergency works such as roads, bridges, ports, sanitary pipe works, and the like.

General quick-hardening cement is prepared by mixing gypsum with clinker containing a quick-hardening mineral such as $CaO.Al_2O_3$, $12CaO.7Al_2O_3$, $11CaO.7Al_2O_3.CaX$, where X is a halogen element, and the like and then pulverizing, or by mixing pulverized materials of the quick-hardening minerals with ordinary Portland cement, gypsum and other additives (Korean Patent Application Pub. Nos. 76-397 and 90-33, and Japanese Patent Application Pub. Nos. 52-139819, 63-285114, and 64-37450).

However, to produce quick-hardening cement, clinker is prepared in a high-temperature firing furnace and thereby preparation cost is expensive, and it is difficult to control volatiles or molten elements and thereby properties of cement may be different according to preparation time. In particular, quick-hardening cement has volume change by crystal transition of ettringite $(3CaO.Al_2O_3.3CaSO_4.32H_2O)$, which is one of hydrates generated through reaction with water and one of main hydrates exhibiting quick-hardening properties, due to a large amount of $Al_2O_3$, or an $Al(OH)_3$ gel hydrate has reduced stability with respect to moisture. In addition, due to existence of sulfate, volume expansion occurs through reaction with $SO_3$ ions. Such phenomena are considered drawbacks since stability of structures may be deteriorated in the long term.

As an advanced method to improve performance of such quick-hardening cement and stability of structures after hardening, a preparation method involving mixing pulverized materials of hauyne-based clinker containing calcium sulfo-aluminate, as a main material, with ordinary Portland cement, gypsum, slaked lime, and the like is known (Korean Patent Application Pub. Nos. 97-008685, 10-0220340, and 10-0310657).

Korean Patent No. 0310657 discloses a basic method of preparing quick-hardening cement, Korean Patent No. 0670458 discloses a method of preparing mortar utilizing quick-hardening cement, and Korean Patent No. 0755272 discloses a method of preparing quick-hardening cement and latex concrete.

However, since quick-hardening cement is generally hardened within several minutes or several dozen minutes through reaction with water during a preparation process of mortar or concrete, exhibits a strength of 20 MPa or more within 3 to 6 hours, and forms an initial cement structure. Accordingly, deformation, in the long term, by moisture evaporation may be minimized and a stable structure, in which few cracks are formed, may be formed, thereby being mainly used in emergency repair of structures such as roads, bridges, and the like. However, quick-hardening cement is not used in most presently developed mortars since most companies developing mortar have technical limitation with respect to quick-hardening cement, and thereby the companies specialize products by adding functional raw materials. Accordingly, there is need to develop a hydraulic binder having quick-hardening properties, without containing the functional elements.

Accordingly, although inventors of the present invention developed an ultra quick-hardening hydraulic binder through mixing PS ball powder with gypsum, the ultra quick-hardening hydraulic binder has problems such as deteriorated workability by initial high hydration heat reaction and initial coagulation of rapidly-cooled steelmaking reduction slag powder (PS ball), and reduced strength in the long term. Therefore, there are lots of problems in that the ultra quick-hardening hydraulic binder is used as a substitute of OPC while exhibiting quick-hardening performance.

SUMMARY OF THE INVENTION

Therefore, the present invention has been made in view of the above problems, and it is an object of the present invention to provide a hydraulic binder composition, which has quick-hardening properties and may be used as a substitute for cement and OPC, using rapidly-cooled steelmaking reduction slag powder (RC-LFS powder) which exhibits ultra quick-hardening performance by reducing initial high hydration heat reaction of rapidly-cooled steelmaking reduction slag powder (RC-LFS powder), delaying initial coagulation to obtain workability, and realizing initial strength and long-term strength.

In accordance with an aspect of the present invention, the above and other objects can be accomplished by the provision of a hydraulic binder composition using rapidly-cooled steelmaking reduction slag powder including the rapidly-cooled steelmaking reduction slag powder (RC-LFS powder) obtained by spraying and scattering gas at high pressure and high speed onto electric furnace smelting reduction slag, which is one of by-products generated during iron smelting performed in an ironworks, and quickly cooling and pulverizing the slag; a retardant to delay coagulation occurring when the rapidly-cooled steelmaking reduction slag powder reacts with water; and gypsum used to delay coagulation occurring when the rapidly-cooled steelmaking reduction slag powder reacts with water, improve delay and initial and long-term strength, and reduce shrinkage.

The rapidly-cooled steelmaking reduction slag powder may be pulverized by rapidly-cooling the smelting reduction slag at 1,300 to 1,400° C. to 400 to 600° C. through spraying and scattering gas onto the slag at high pressure and high speed for 5 to 10 seconds.

The rapidly-cooled steelmaking reduction slag powder may have a fineness of 3,000 cm$^2$/g or higher.

The gypsum may be at least one selected from anhydrous gypsum, calcined gypsum, and dihydrate gypsum.

A weight ratio of the rapidly-cooled steelmaking reduction slag powder to the gypsum may be 60:40 to 90:10.

The retardant may be at least one selected from citric acid powder and tartaric acid powder.

A weight ratio of the rapidly-cooled steelmaking reduction slag powder to the retardant may be 100:0.1 to 100:2.

In accordance with another aspect of the present invention, there is provided a method of preparing a hydraulic binder composition using rapidly-cooled steelmaking reduction slag powder including rapidly-cooling the smelting reduction slag by spraying and scattering gas at high pressure and high speed onto electric furnace smelting reduction slag, which is one of by-products generated during iron smelting performed in an ironworks, preparing the rapidly-cooled steelmaking reduction slag powder by pulverizing the rapidly-cooled steelmaking reduction slag, adding gypsum to the rapidly-cooled steelmaking reduction slag powder, and adding a retardant to a mixture of the rapidly-cooled steelmaking reduction slag powder and the gypsum to delay coagulation.

In the step of rapidly-cooling the steelmaking reduction slag, the smelting reduction slag at 1,300 to 1,400° C. may be rapidly cooled to 400° C. to 600° C. by spraying and scattering gas at high pressure and high speed onto the slag for 5 to 10 seconds.

In the step of preparing the rapidly-cooled steelmaking reduction slag powder, the rapidly-cooled steelmaking reduction slag powder may be pulverized to a fineness of 3,000 cm$^2$/g or higher.

The gypsum may be at least one selected from anhydrous gypsum, calcined gypsum, and dihydrate gypsum.

A weight ratio of the rapidly-cooled steelmaking reduced slag powder to the gypsum may be 60:40 to 90:10.

The retardant may be at least one selected from citric acid powder and tartaric acid powder.

A weight ratio of the rapidly-cooled steelmaking reduction slag powder to the retardant may be 100:0.1 to 100:2.

The present invention may provide workability by delaying initial high hydration heat reaction and initial coagulation of rapidly-cooled steelmaking reduction slag powder (RC-LFS powder), may be used in a variety of fields requiring quick-hardening characteristics of the rapidly-cooled steelmaking reduction slag powder (RC-LFS powder) by exhibiting initial and long-term strength, and may be used as a substitute for cement or OPC cement having rapid-setting properties, thereby providing advantageous effects.

BRIEF DESCRIPTION OF THE DRAWINGS

FIG. 18 illustrates SEM images of a hardened body of a hydraulic binder composition according to the present invention.

DETAILED DESCRIPTION OF THE INVENTION

Figures 1, 2:
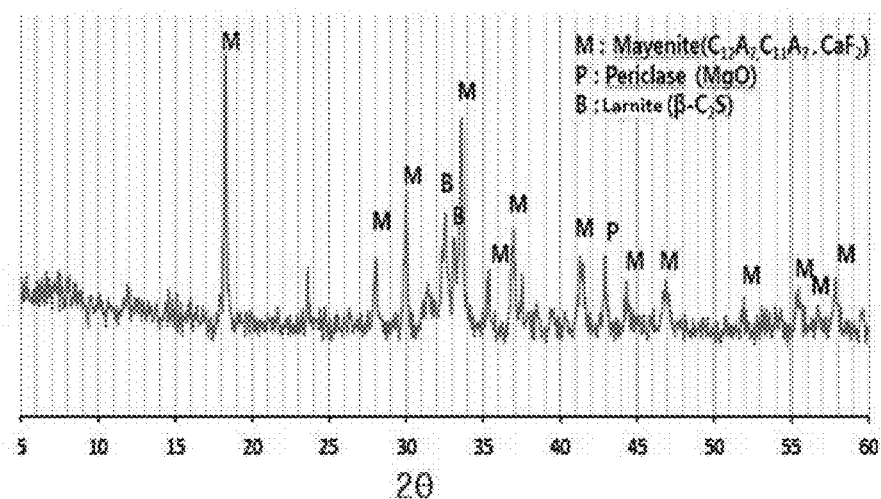
FIG. 1 illustrates a table analyzing rapidly-cooled steelmaking reduced slag fine powder oxides according to the present invention analysis table.
FIG. 2 illustrates an XRD graph of a rapidly-cooled steelmaking reduced slag fine powder mineral composition according to the present invention.

The present invention is characterized by the provision of a hydraulic binder composition using rapidly-cooled steelmaking reduction slag powder including the rapidly-cooled steelmaking reduction slag powder (RC-LFS powder) obtained by spraying and scattering gas at high pressure and high speed onto electric furnace smelting reduction slag, which is one of by-products generated during iron smelting performed in an ironworks, and quickly cooling and pulverizing the slag; a retardant to delay coagulation occurring when the rapidly-cooled steelmaking reduction slag powder reacts with water; and gypsum used to delay coagulation occurring when the rapidly-cooled steelmaking reduction slag powder reacts with water, improve delay and initial and long-term strength, and reduce shrinkage.

In addition, the present invention is characterized by the provision of the hydraulic binder composition using the rapidly-cooled steelmaking reduction slag powder, wherein the rapidly-cooled steelmaking reduction slag powder is pulverized by rapidly-cooling the smelting reduction slag at 1,300 to 1,400° C. to 400 to 600° C. through spraying and scattering gas onto the slag at high pressure and high speed for 5 to 10 seconds.

In addition, the present invention is characterized by the provision of the hydraulic binder composition using the rapidly-cooled steelmaking reduction slag powder, wherein the rapidly-cooled steelmaking reduction slag powder has a fineness of 3,000 $cm^2/g$ or higher.

In addition, the present invention is characterized by the provision of the hydraulic binder composition using the rapidly-cooled steelmaking reduced slag powder, wherein the gypsum is at least one selected from anhydrous gypsum, calcined gypsum, and dihydrate gypsum.

In addition, the present invention is characterized by the provision of the hydraulic binder composition using the rapidly-cooled steelmaking reduced slag powder, wherein a weight ratio of the rapidly-cooled steelmaking reduced slag powder to the gypsum is 60:40 to 90:10.

In addition, the present invention is characterized by the provision of the hydraulic binder composition using the rapidly-cooled steelmaking reduced slag powder, wherein the retardant is at least one selected from citric acid powder and tartaric acid powder.

In addition, the present invention is characterized by the provision of the hydraulic binder composition using the rapidly-cooled steelmaking reduced slag powder, wherein a weight ratio of the rapidly-cooled steelmaking reduced slag powder to the retardant is 100:0.1 to 100:2.

In addition, the present invention is characterized by the provision of a method of preparing a hydraulic binder composition using rapidly-cooled steelmaking reduced slag powder including rapidly-cooling the smelting reduction slag by spraying and scattering gas at high pressure and high speed onto electric furnace smelting reduction slag, which is one of by-products generated during iron smelting performed in an ironworks, preparing the rapidly-cooled steelmaking reduced slag powder by pulverizing the rapidly-cooled steelmaking reduced slag, adding gypsum to the rapidly-cooled steelmaking reduced slag powder, and adding a retardant to a mixture of the rapidly-cooled steelmaking reduced slag powder and the gypsum to delay coagulation.

In addition, the present invention is characterized by the provision of the method of preparing the hydraulic binder composition using the rapidly-cooled steelmaking reduced slag powder, wherein, in the step of rapidly-cooling the steelmaking reduced slag, the smelting reduction slag at 1,300 to 1,400° C. is rapidly cooled to 400 to 600° C. by spraying and scattering gas at high pressure and high speed onto the slag for 5 to 10 seconds.

In addition, the present invention is characterized by the provision of the method of preparing the hydraulic binder composition using the rapidly-cooled steelmaking reduction slag powder, wherein, in the step of preparing the rapidly-cooled steelmaking reduction slag powder, the rapidly-cooled steelmaking reduction slag powder is pulverized to a fineness of 3,000 $cm^2/g$ or higher.

In addition, the present invention is characterized by the provision of the method of preparing the hydraulic binder composition using the rapidly-cooled steelmaking reduced slag powder, wherein the gypsum is at least one selected from anhydrous gypsum, calcined gypsum, and dihydrate gypsum.

In addition, the present invention is characterized by the provision of the method of preparing the hydraulic binder composition using the rapidly-cooled steelmaking reduced slag powder, wherein a weight ratio of the rapidly-cooled steelmaking reduced slag powder to the gypsum is 60:40 to 90:10.

In addition, the present invention is characterized by the provision of the method of preparing the hydraulic binder composition using the rapidly-cooled steelmaking reduced slag powder, wherein the retardant is at least one selected from citric acid powder and tartaric acid powder.

In addition, the present invention is characterized by the provision of the method of preparing the hydraulic binder composition using the rapidly-cooled steelmaking reduced slag powder, wherein a weight ratio of the rapidly-cooled steelmaking reduced slag powder to the retardant is 100:0.1 to 100:2.

Exemplary embodiments of the present invention are described in detail for those of ordinary skill in the art to easily implement with reference to the accompanying drawings. However, the present invention may be implemented in various different forms and is not limited to these embodiments.

First, rapidly-cooled steelmaking reduction slag powder having a fineness of 4,000 $cm^2/g$ was prepared by spraying and scattering gas at high pressure and high speed for 5 to 10 seconds onto electric furnace smelting reduction slag, which is one of by-products generated in the production of iron, and rapidly cooling to 500° C. and ball mill pulverizing the slag at 1,350° C. With respect to the rapidly-cooled steelmaking reduction slag powder, oxide analysis was carried out, XRD graphs representing a mineral composition, optical microscope images, and SEM images were observed, and hydrothermal characteristics, mortar strength characteristics, and length change characteristics were measured.

Figure 3:
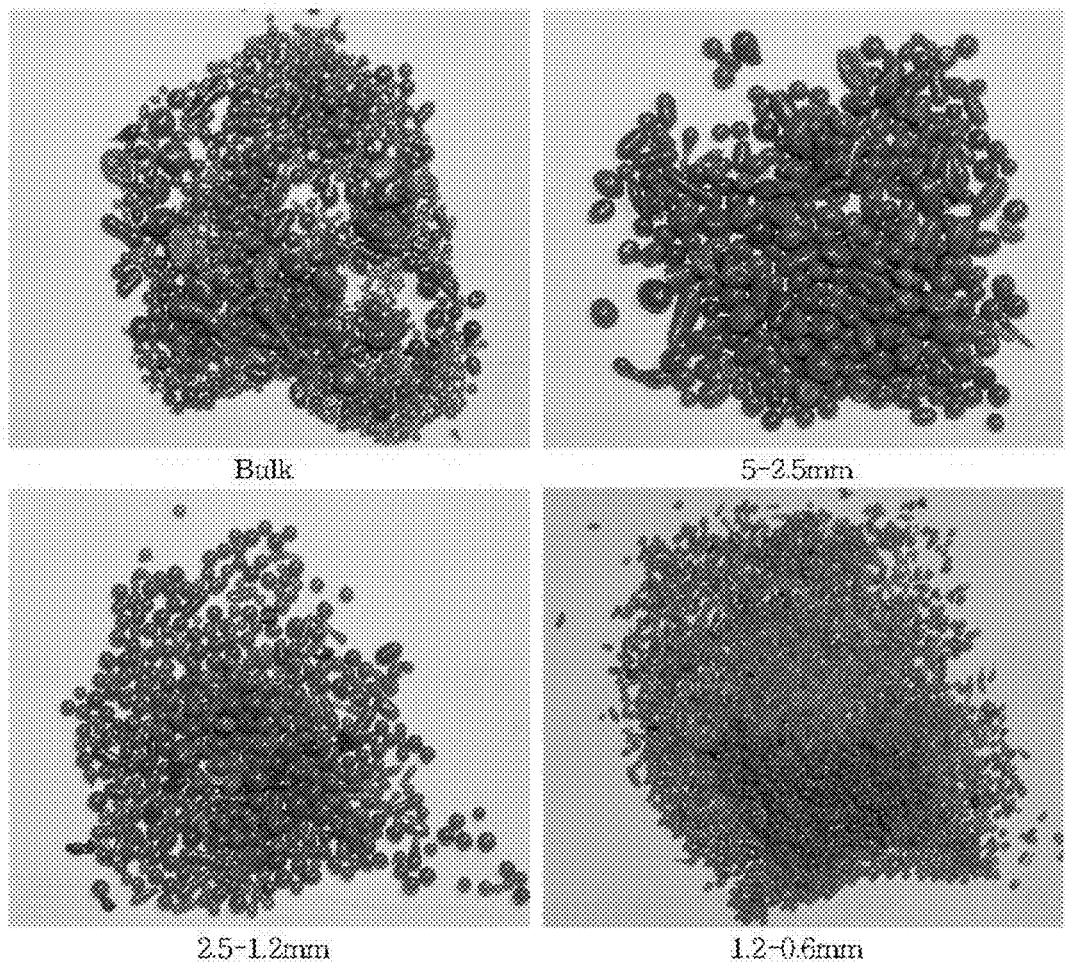
FIG. 3 illustrates images of different particle sizes of rapidly-cooled steelmaking reduced slag aggregates according to the present invention.
Figure 4:
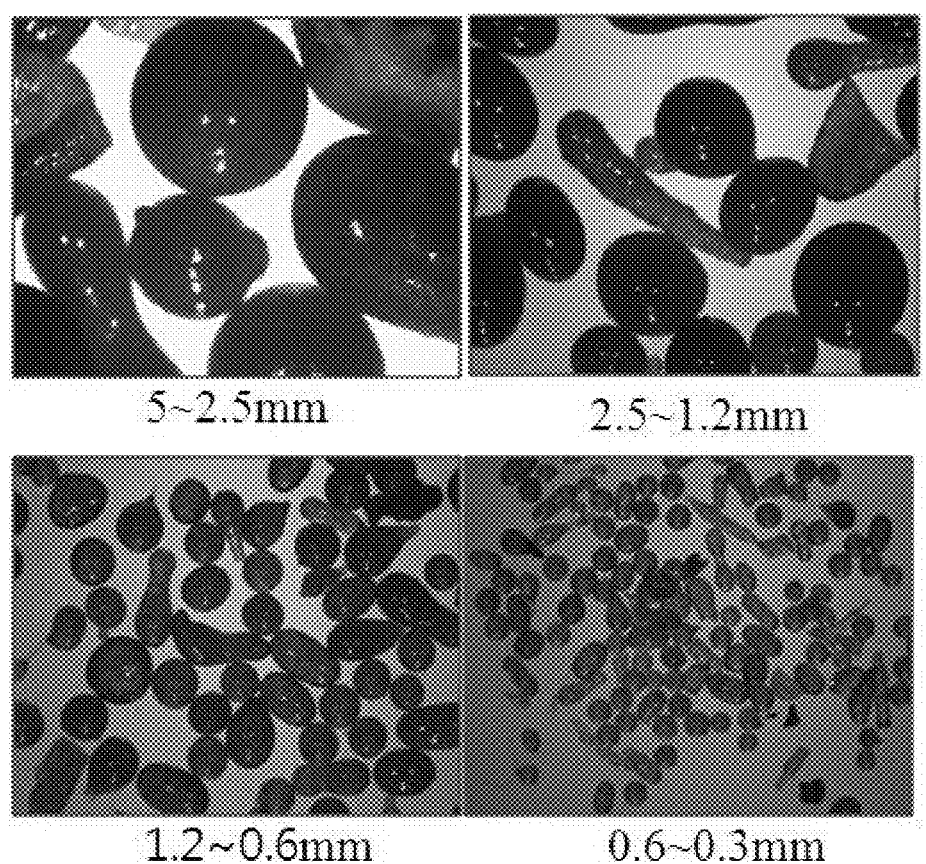
FIG. 4 illustrates optical microscope images of different particle sizes of rapidly-cooled steelmaking reduced slag aggregates according to the present invention.
Figure 5:
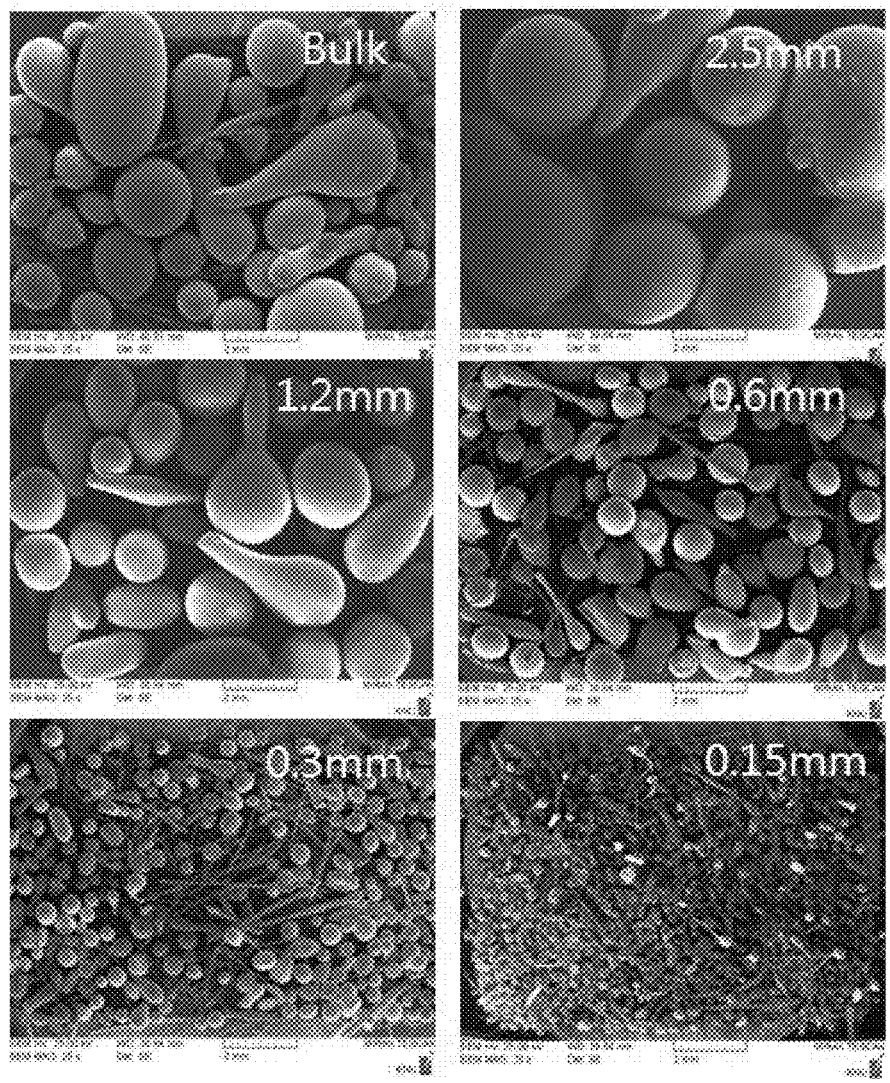
FIG. 5 illustrates SEM images of different particle sizes of rapidly-cooled steelmaking reduced slag aggregates according to the present invention.
Figure 6:
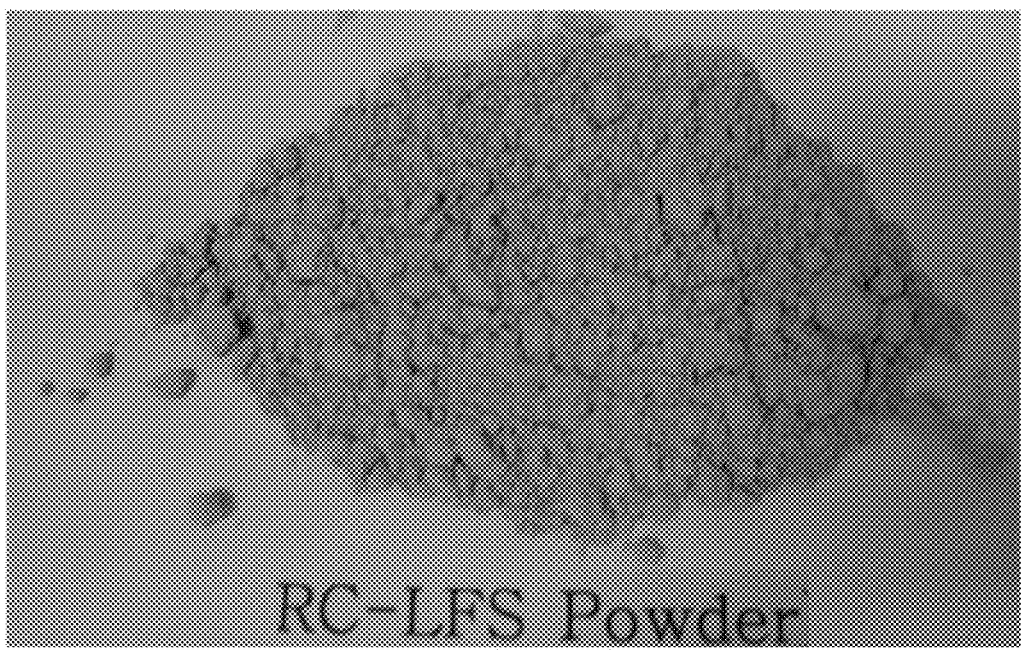
FIG. 6 illustrates an image of rapidly-cooled steelmaking reduced slag fine powder according to the present invention.
Figure 7:
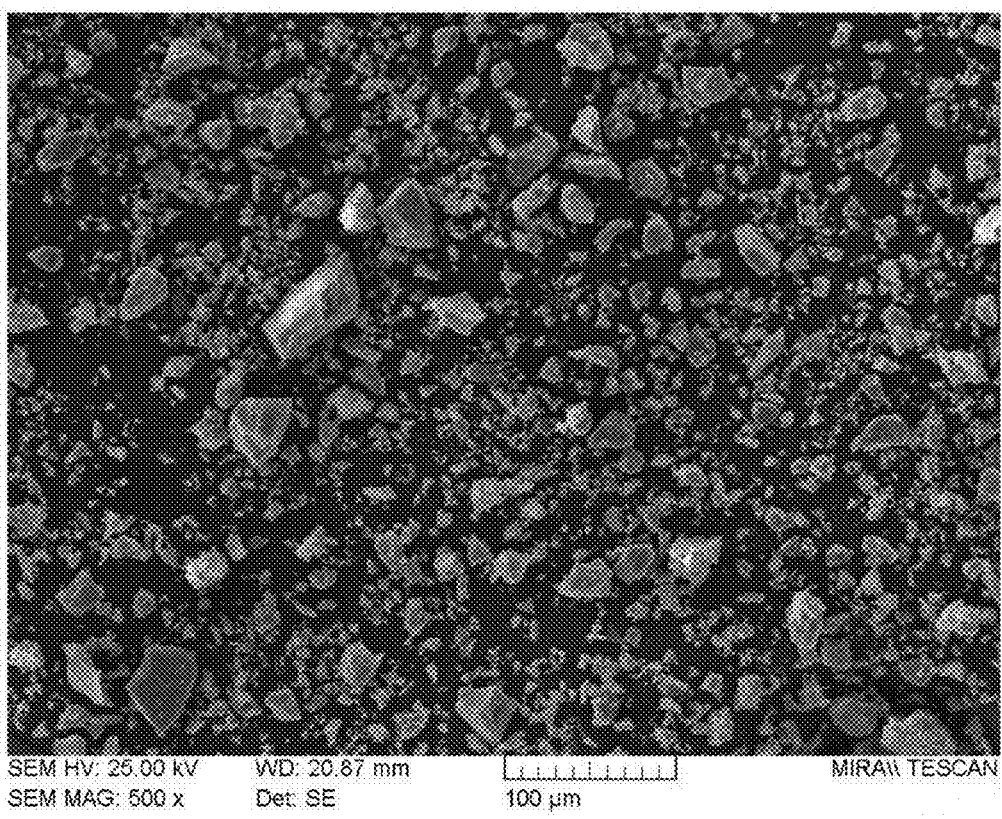
FIG. 7 illustrates an SEM image (×500) of rapidly-cooled steelmaking reduced slag fine powder according to the present invention
Figure 8:
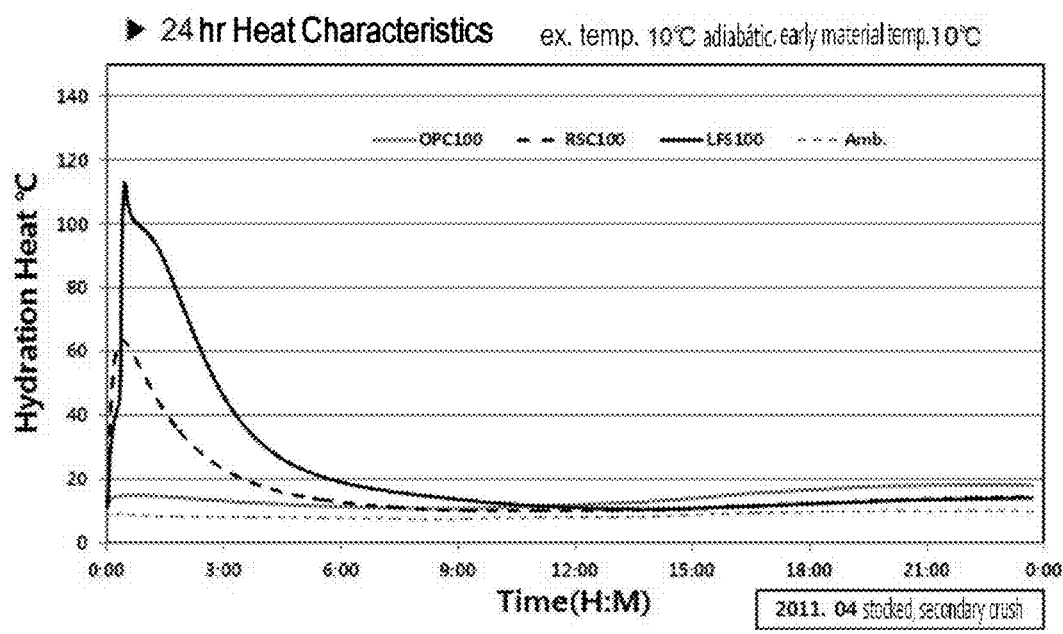
FIG. 8 illustrates hydrothermal graphs of rapidly-cooled steelmaking reduced slag fine powder according to the present invention.
Figure 9:
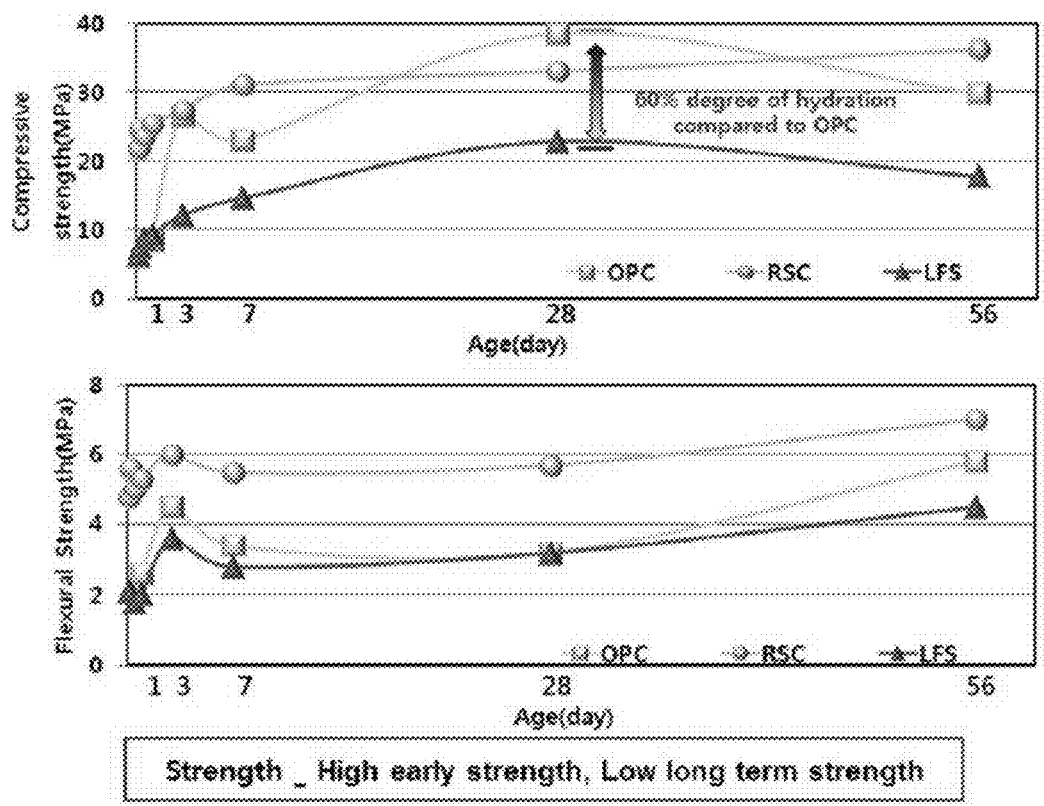
FIG. 9 illustrates graphs representing strength characteristics of a hardened body of rapidly-cooled steelmaking reduced slag fine powder according to the present invention.
Figure 10:
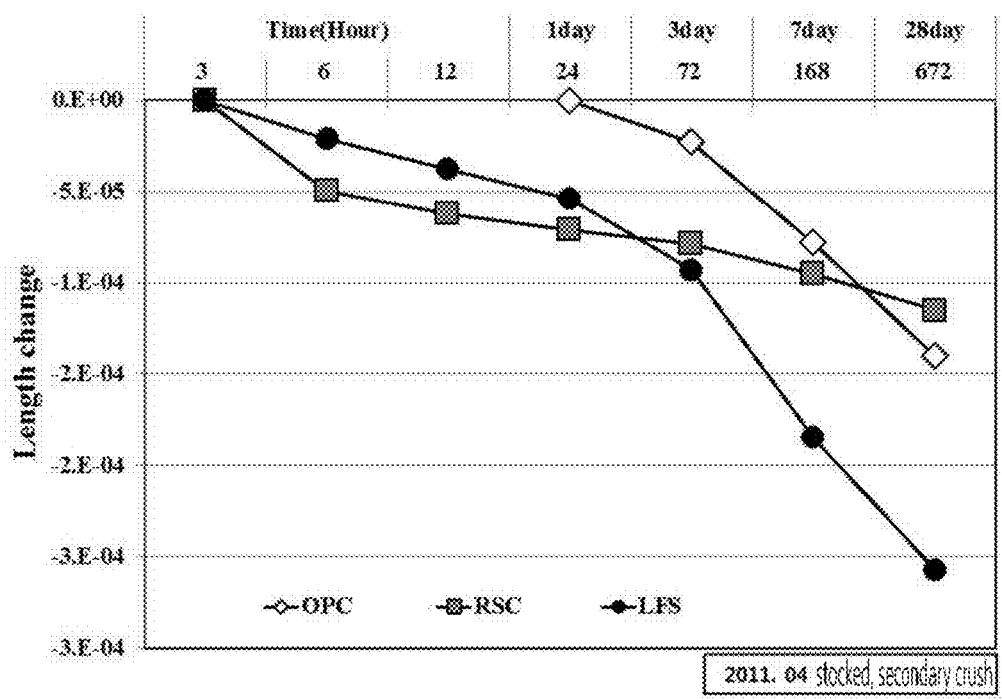
FIG. 10 illustrates graphs representing length changes of a hardened body of rapidly-cooled steelmaking reduced slag fine powder according to the present invention.
Figure 11:
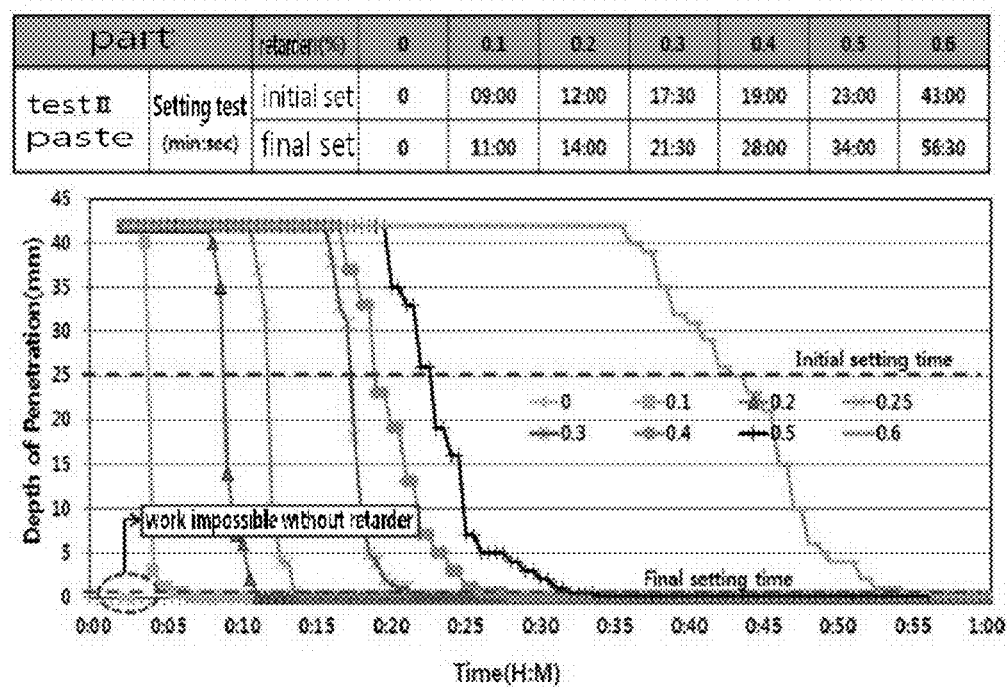
FIG. 11 illustrates graphs representing coagulation characteristics of rapidly-cooled steelmaking reduced slag fine powder using a retardant, according to the present invention.
Figure 12:
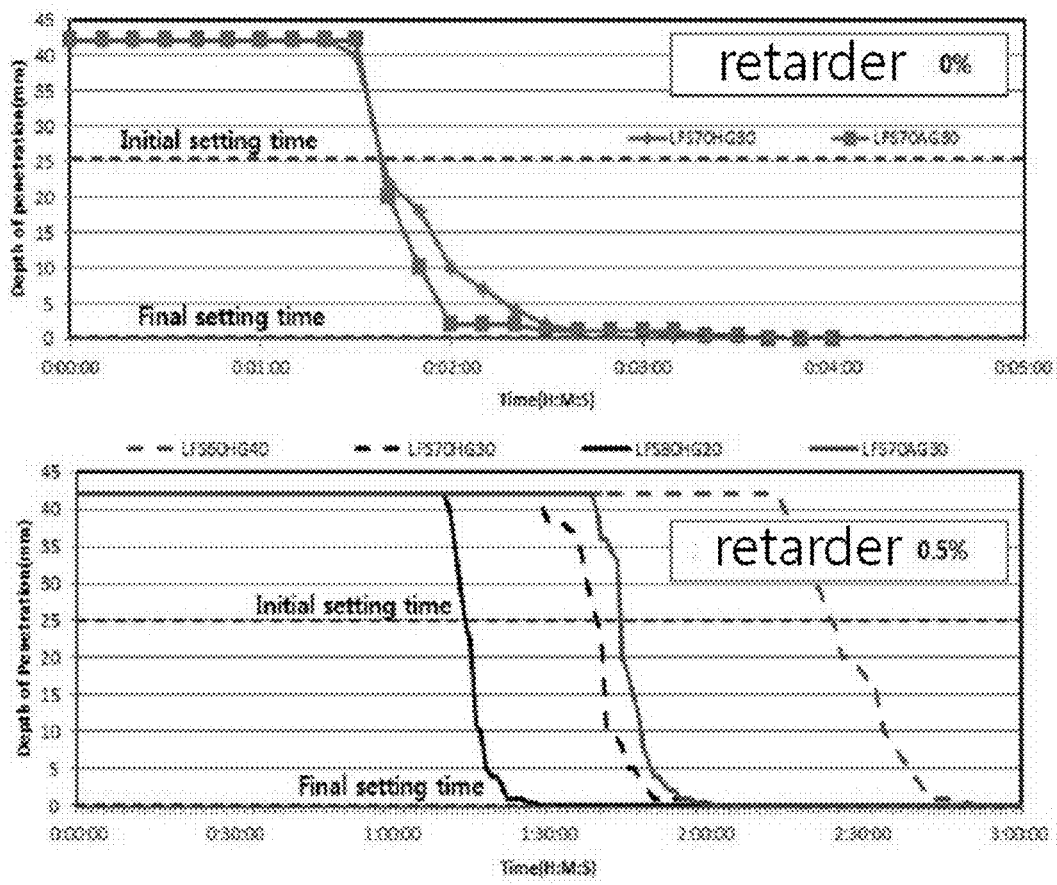
FIG. 12 illustrates graphs representing coagulation characteristics a hydraulic binder composition according to the present invention.
Figure 13:
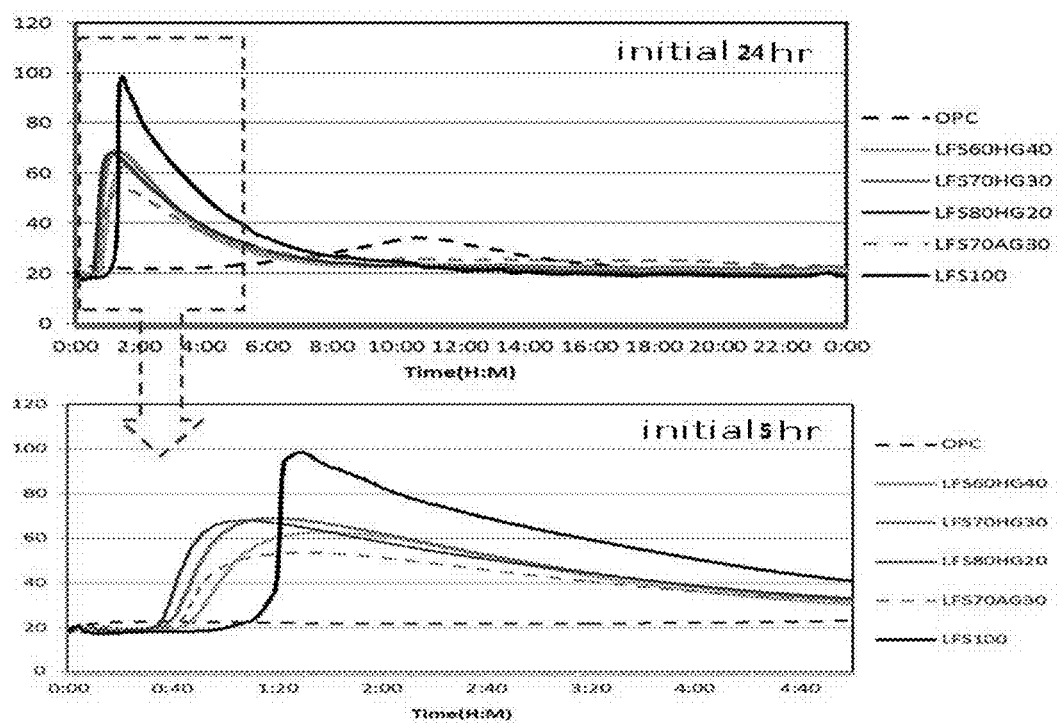
FIG. 13 illustrates hydrothermal graphs of a hydraulic binder composition according to the present invention.
Figure 14:
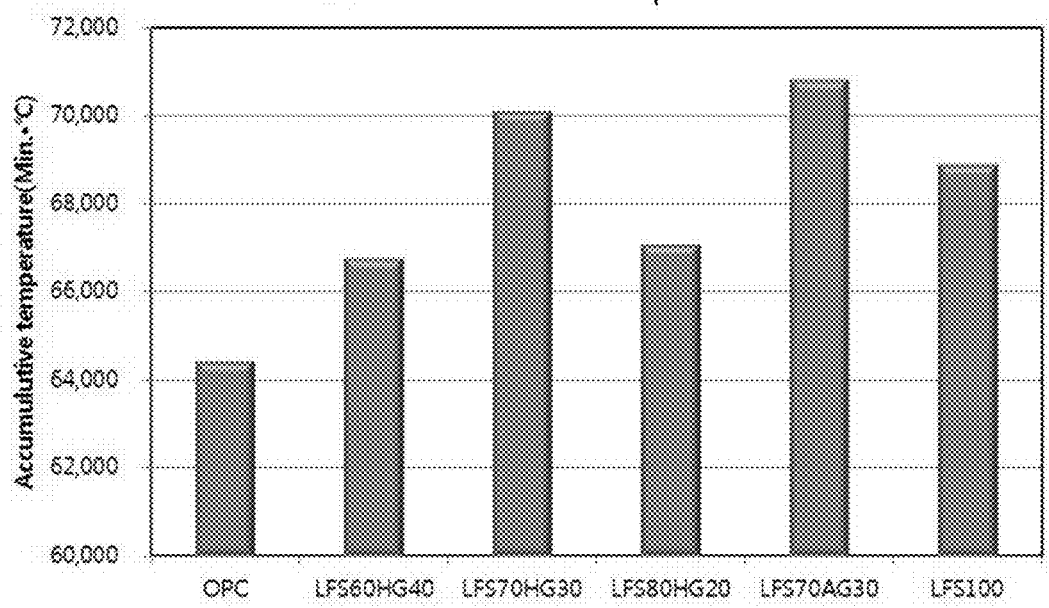
FIG. 14 illustrates hydration heat, which is accumulated over 48 hours, of a hydraulic binder composition according to the present invention.
Figure 15:
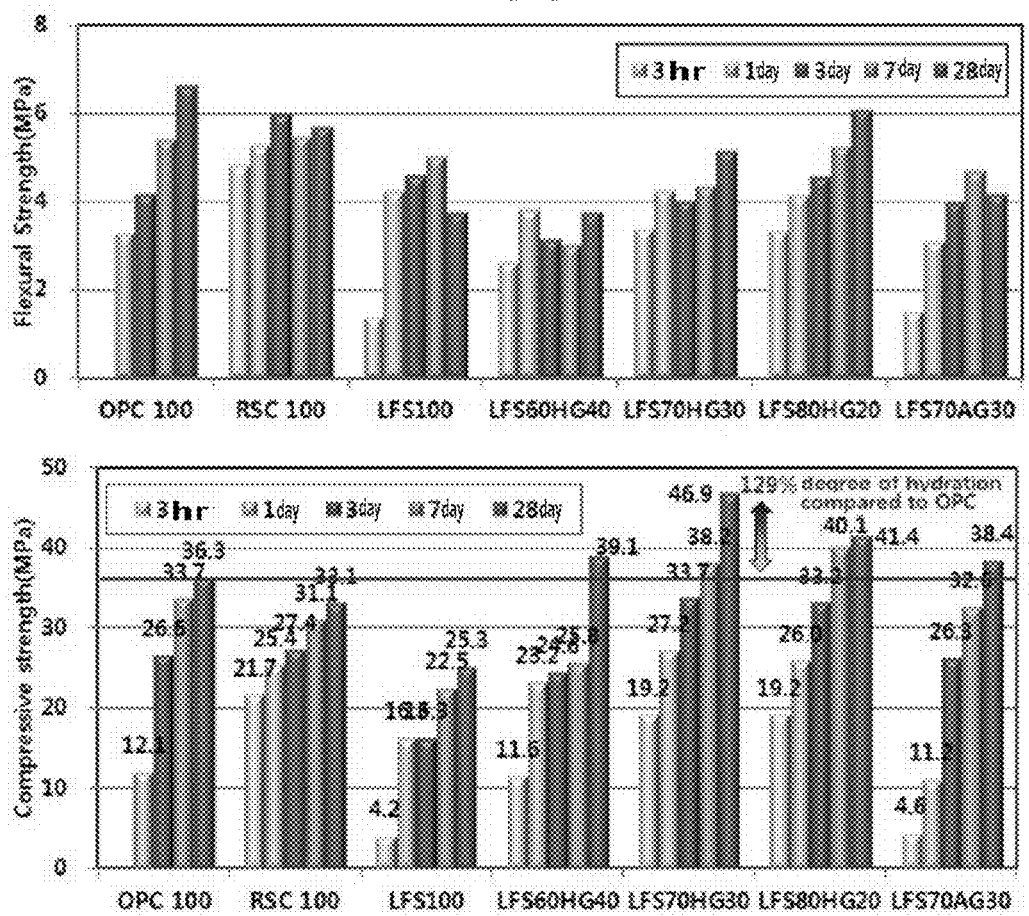
FIG. 15 illustrates graphs representing strength characteristics of a hydraulic binder composition according to the present invention.
Figure 16:
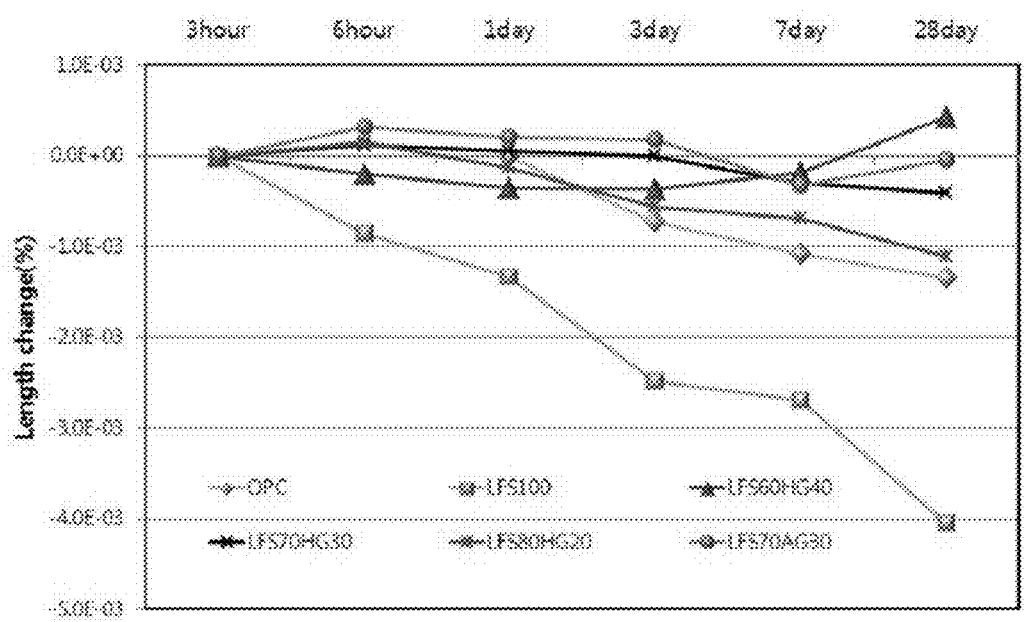
FIG. 16 illustrates graphs representing length changes of a hydraulic binder composition according to the present invention.
Figure 17:
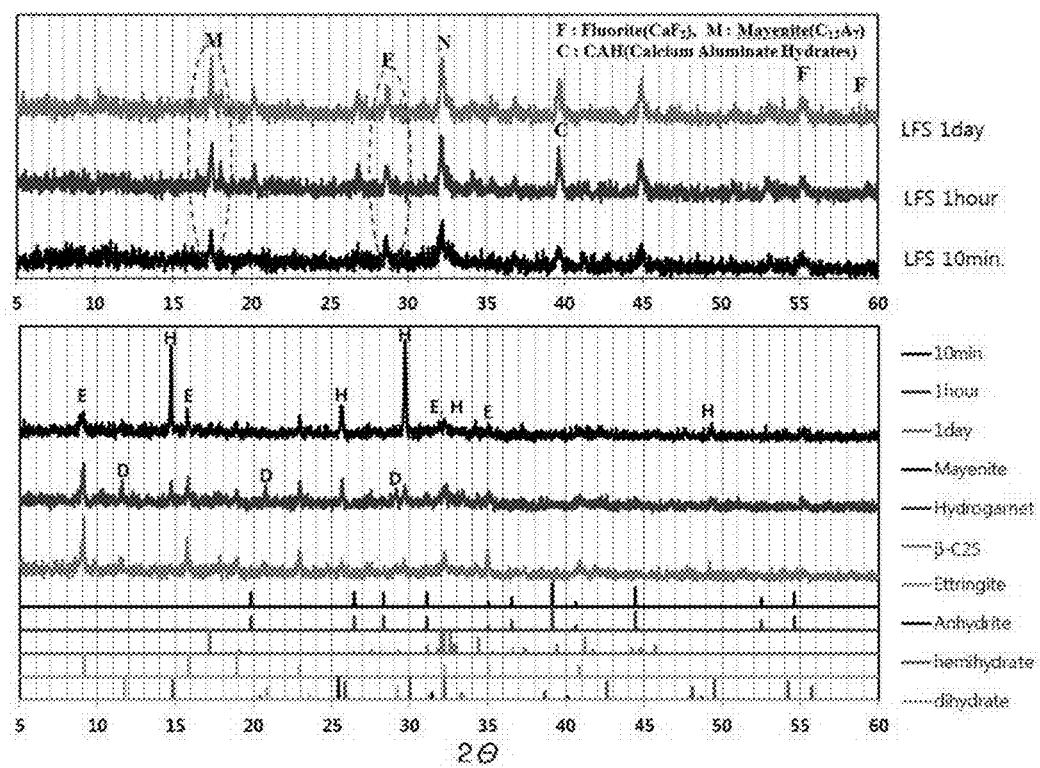
FIG. 17 illustrates XRD graphs representing a mineral composition of a hardened body of a hydraulic binder composition according to the present invention.

FIG. 1 illustrates a table analyzing rapidly-cooled steelmaking reduced slag fine powder oxides according to the present invention, FIG. 2 illustrates an XRD graph of a rapidly-cooled steelmaking reduced slag fine powder mineral composition according to the present invention, FIG. 3 illustrates images of different particle sizes of rapidly-cooled steelmaking reduced slag aggregates according to the present invention, FIG. 4 illustrates optical microscope images of different particle sizes of rapidly-cooled steelmaking reduced slag aggregates according to the present invention, FIG. 5 illustrates SEM images of different particle sizes of rapidly-cooled steelmaking reduced slag aggregates according to the present invention, FIG. 6 illustrates an image of rapidly-cooled steelmaking reduced slag fine powder according to the present invention, FIG. 7 illustrates an SEM image (×500) of rapidly-cooled steelmaking reduced slag fine powder according to the present invention, FIG. 8 illustrates hydrothermal graphs of rapidly-cooled steelmaking reduced slag fine powder according to the present invention, FIG. 9 illustrates graphs representing strength characteristics of a hardened body of rapidly-cooled steelmaking reduced slag fine powder according to the present invention, FIG. 10 illustrates graphs representing length changes of a hardened body of rapidly-cooled steelmaking reduced slag fine powder according to the present invention, FIG. 11 illustrates graphs representing coagulation characteristics of rapidly-cooled steelmaking reduced slag fine powder using a retardant, according to the present invention, FIG. 12 illustrates graphs representing coagulation characteristics a hydraulic binder composition according to the present invention, FIG. 13 illustrates hydrothermal graphs of a hydraulic binder composition according to the present invention, FIG. 14 illustrates hydration heat, which is accumulated over 48 hours, of a hydraulic binder composition according to the present invention, FIG. 15 illustrates graphs representing strength characteristics of a hydraulic binder composition according to the present invention, FIG. 16 illustrates graphs representing length changes of a hydraulic binder composition according to the present invention, FIG. 17 illustrates XRD graphs representing a mineral composition of a hardened body of a hydraulic binder composition according to the present invention, and FIG. 18 illustrates SEM images of a hardened body of a hydraulic binder composition according to the present invention.

First, as shown in the oxide analysis result of the rapidly-cooled steelmaking reduced slag powder (LFS) of FIG. 1, the rapidly-cooled steelmaking reduced slag powder (LFS) includes 40 to 60 wt % of CaO, 5 to 20 wt % of $SiO_2$, 10 to 35 wt % of $Al_2O_3$. The rapidly-cooled steelmaking reduced slag powder (LFS) contains, an amount of alumina ($Al_2O_3$), which facilitate hardening and improves early-strength properties, corrosion resistance, and fire resistance, is 2 to 7 times higher than ordinary Portland cement or regulated set cement with respect to wt %, and an amount of magnesia (MgO, Periclase), which facilitates hardening, improves strength, and prevents cracks, is 2 to 3 times higher than ordinary Portland cement or regulated set cement with respect to wt %. Accordingly, the rapidly-cooled steelmaking reduced slag powder (LFS) has much more advantageous ingredients, when compared with ordinary Portland cement (OPC) and regulated set cement (RSC).

As shown in the mineral analysis (XRD diagram) result of the rapidly-cooled steelmaking reduced slag, the rapidly-cooled steelmaking reduced slag powder contains a large amount of mayenite ($C_{12}A_7$, $12CaO.7Al_2O_3$ or $C_{11}A_7.CaF_2$, $11CaO.7Al_2O_3.CaF_2$) which is a quick-hardening hydrate. Here, it can be confirmed that C12A7 has ultra quick-hardening effects since it is quickly set by reaction with water, and $\beta$-$C_2S$ (belite, $\beta$-$2CaO.SiO_2$) and magnesia (MgO, periclase), which are main constituent compounds of cement and greatly influence hydraulic properties, are contained in large amounts therein.

As shown in the images in accordance with particle sizes, the optical microscope images in accordance with particle sizes, and the SEM images of different particle sizes of FIGS. 3 to 5, particle shapes of the rapidly-cooled steelmaking reduced slag aggregates are fine aggregates which are almost globular in shape. Accordingly, when the rapidly-cooled steelmaking reduced slag aggregates are utilized as a concrete material, liquidity increases due to ball bearing effect and the rapidly-cooled steelmaking reduced slag aggregates have extremely high utilization due to a high solid content in aggregates.

FIGS. 6 to 7 illustrate an image of the rapidly-cooled steelmaking reduced slag fine powder according to the present invention and an image at 500× magnification using SEM. The rapidly-cooled steelmaking reduced slag aggregates illustrated in FIG. 4 may be used by pulverizing to a fineness of ordinary Portland cement or more.

As shown in the result of measuring initial hydration heat due to heat emission characteristics over 24 hours of FIG. 8, the rapidly-cooled steelmaking reduced slag powder exhibits much higher hydration heat than OPC and RSC. Through such result, it can be confirmed that initial hydration of the rapidly-cooled steelmaking reduced slag powder rapidly occurs and quick setting thus occurs. The reduced slag fine powder has rapid reactivity in an initial stage and thus exhibits quick setting in an initial stage, thereby precluding coagulation. Such high hydration heat and quick setting are caused by the mayenite ($C_{12}A_7$, $12CaO.Al_2O_3$) of the rapidly-cooled steelmaking reduced slag powder and thereby workability may be deteriorated. In addition, initial high hydration heat and reduction of hydration heat due to rapid reaction may lead to expansion and shrinkage, thereby leading to reduction of strength.

In addition, $C_{12}A_7$, which is a main compound inducing an initial hydration reaction, reacts with water ($H_2O$) and thus generates $C_3AH_6$ using heat through the reaction. $C_3AH_6$ binds within initial several minutes or several hours after generation of $C_3AH_6$ due to strong binding force of $C_3AH_6$ and forms hydrate films near unhydrated particles. The formed hydrate films prevent hydration of unhydrated particles in the long term, thereby deteriorating long-term strength and durability.

As shown in the mortar strength test result to measure strength characteristics of the hardened body of the rapidly-cooled steelmaking reduced slag fine powder according to the present invention of FIG. 9, it can be confirmed that the hardened body of the rapidly-cooled steelmaking reduced slag powder exhibits high strength up to initial day 1, but poorer strength, long-term aged compression, and bending strength at day 3 than OPC and RSC. As illustrated in FIG. 10, it can be confirmed that the hardened body of rapidly-cooled steelmaking reduced slag fine powder according to the present invention has a high shrinkage degree during length changes, thereby having dramatically reduced volume stability.

As described above, although the rapidly-cooled steelmaking reduced slag powder has possibility to use as an ultra quick-hardening hydraulic binder, it is difficult to work with the rapidly-cooled steelmaking reduced slag powder due to initial high hydration heat reaction and initial coagulation thereof, and, when the rapidly-cooled steelmaking reduced slag powder is used, initial and long-term strength are reduced. Accordingly, so as to use as a substitute for OPC cement having initial and long-term strength while exhibiting quick-hardening characteristics, a retardant, which may delay initial high hydration heat reaction and initial coagulation, must be used.

Accordingly, inventors of the present invention developed a retardant of the rapidly-cooled steelmaking reduced slag powder to obtain workability by delaying initial high hydration heat reaction and initial coagulation of the rapidly-cooled steelmaking reduced slag powder and to express initial and long-term strength by activating generation of needle-shaped ettringite, thus completing the present invention.

The hydraulic binder composition using the rapidly-cooled steelmaking reduced slag powder according to the present invention includes rapidly-cooled steelmaking reduced slag powder (RC-LFS powder) by spraying and scattering gas at high pressure and high speed onto electric furnace smelting reduction slag, which is one of by-products generated during iron smelting performed in an ironworks, and quickly cooling and pulverizing the slag; a retardant to delay coagulation occurring when the rapidly-cooled steelmaking reduced slag powder reacts with water; and gypsum used to delay coagulation occurring when the rapidly-cooled steelmaking reduced slag powder reacts with water and improve initial and long-term strength.

The retardant used in the present invention may be one polybasic acid or more selected from citric acid powder or tartaric acid powder. The one polybasic acid or more considerably delay a rate of coagulation, thereby preventing quick setting phenomenon.

Citric acid is an organic acid which are generally present in plants and animals. A formula thereof is represented by $HOOCCH_2$—$C(OH)COOH$—$CH_2COOH$. Citric acid is a colorless and semitransparent crystal or powder, and has strongly sour taste. In addition, citric acid has a specific gravity of 1.542 and extremely easily dissolves in water. With regard to distribution of citric acid in plants and animals, citric acid is present in a content of approximately 4.0 to 8.0% in a lemon, in a content of approximately 1.2 to 2.1% in a graph, and in a content of approximately 1.2 to 2.1% in an orange. In the human body, citric acid is present in an amount of ppm units in blood, bonds, breast milk and the like and in an amount of approximately 1 mg/kg in the whole human body. In addition to, citric acid is contained in an amount of approximately 0.1 to 0.25% in beverages, in an amount of approximately 0.25 to 4.0% in taste or flavor controllers. Furthermore, citric acid is generally used in jelly, jam, candy, cosmetics and the like, is known as functioning as a dispersant, an antioxidant, and anti-microorganism, and extremely eco-friendly.

In addition, tartaric acid (dihydroxy succinic acid), an organic acid, may be used alone or with citric acid powder in the present invention. Tartaric acid is a colorless and transparent crystal or white powder and odorless, has sour taste, and are stable in the air. Tartaric acid has a density of 1.76 and m.p. of 170° C., and easily dissolves in water. Tartaric acid is a dibasic acid having two OH groups in a molecular and represented by $HOOC(CH_2O)_4COOH$. Isomers having shapes such as L, D, meso and the like are present in tartaric acid. Tartaric acid is broadly present in fruits and plants in a natural free state, Ca-salt, or K-salt type, is broadly used with citric acid in snacks and foods, and is an eco-friendly organic acid.

With regard to a coagulation rate delay mechanism of citric acid or tartaric acid, citric acid or tartaric acid is dissolved in water and is thus dissociated into citric acid groups or tartaric acid groups, which are anions, and cations. The citric acid groups or tartaric acid groups charged into anions react with weakly alkaline materials such as water-soluble Ca, Na, and K compounds and thus form salts thereof, namely, calcium citrate, potassium citrate, sodium citrate, aluminum citrate, calcium tartrate, potassium tartrate, sodium tartrate, aluminum tartrate. In this formation process, since the citric acid groups or tartaric acid groups forms salts with Ca and Al in the mayenite ($C_{12}A_7$, $12CaO.Al_2O_3$) of the rapidly-cooled steelmaking reduced slag powder, $Ca^{2+}$ ions and $Al^{3+}$ ions eluted from the mayenite ($C_{12}A_7$, $12CaO.Al_2O_3$) react as soon as the citric acid groups or tartaric acid groups contact water, thereby delaying generation of calcium aluminate hydrates ($CaO.Al_2O_3.nH_2O$).

Such citric acid or tartaric acid is added to the rapidly-cooled steelmaking reduced slag powder according to the present invention, and thus delays hydration coagulation, improves construction ability by improving dispersibility, provides a eco-friendly hardened body by reducing strong alkalis existing in a hardened body after hardening, and contributes to strength improvement.

In the present invention, a weight ratio of the rapidly-cooled steelmaking reduced slag powder to the retardant is preferably 100:0.1 to 100:2. When a weight ratio of the retardant is less than 0.1, it is difficult to anticipate delay effect. On the other hand, when a weight ratio of the retardant exceeds 2, quick-hardening performance may be reduced, and strength expression and durability may be deteriorated.

Meanwhile, to delay rapid hydration reaction of calcium aluminate in the present invention and maintain generation reaction of ettringite in the present invention, $SO_3^{2-}$ must be continuously provided into an aqueous solution. Due to such a reason, gypsum is used.

That is, when calcium aluminate of mayenite ($C_{12}A_7$, $12CaO.Al_2O_3$), which is a quick-hardening hydrate of rapidly-cooled steelmaking reduced slag powder, contacts water, the calcium aluminate generates hydrogarnet, namely, a $C_3AnH_2O$ hydrate, where n is 6 to 12. Soon after that, the $C_3AnH_2O$ hydrate reacts with gypsum, resulting in formation of ettringite ($3CaO.Al_2O_3.3CaSO_4.32H_2O$).

With regard to initial coagulation delay function and initial and long-term strength expression mechanism of gypsum, in the beginning when the rapidly-cooled steelmaking reduced slag powder contacts water, calcium aluminate, which performs rapid hydration reaction, reacts with $SO_3^{2-}$ ions eluted from calcined gypsum and thus small ettringite forms over surfaces of the calcium aluminate hydrates. Accordingly, it is prevent to contact water and rapid hydration reaction is thus prevented. As a result, a reaction rate thereof is delayed and pot life is provided. Subsequently, $SO_3^{2-}$ ions are continuously provided thereto and a crystal shape of ettringite is thus changed into a prismatic needle shape. Ettringite having such a changed shape destroys films of hydrates surrounding calcium aluminate, thereby contacting water again. Accordingly, active ettringite generation reaction occurs, and initial and long-term strength expression is thus accomplished.

A correlation of gypsum is the same as in a figure below. In the present invention, any one of dihydrate gypsum, α-calcined gypsum, β-calcined gypsum, and anhydrous gypsum may be used.

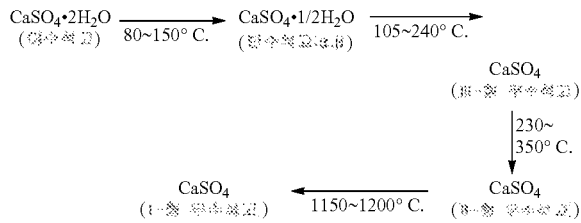

In the present invention, a weight ratio of the rapidly-cooled steelmaking reduced slag powder to gypsum is preferably 60:40 to 90:10. When an amount of gypsum is less than 10 by a weight ratio, $SO_3^{2-}$ ions required for reaction are deficient and an ettringite generation amount is thus reduced, thereby strength expression is reduced. On the other hand, when an amount of gypsum exceeds 40 by a weight ratio, intrinsic properties of the rapidly-cooled steelmaking reduced slag powder may be reduced due to an excessive gypsum content.

Example 1

Electric furnace smelting reduction slag at 1,350° C. was rapidly-cooled to 500° C. by spraying and scattering gas at high pressure and high speed for 5 to 10 seconds, and ball mill pulverized to prepare C having a fineness of 4,000 cm²/g. To the rapidly-cooled steelmaking reduction slag powder, a retardant was added in amounts of 0.0, 0.1, 0.2, 0.3, 0.4, 0.5, and 0.6 wt %. In addition, 20 wt %, 30 wt %, and 40 wt % of α-calcined gypsum, and 30 wt % of anhydrous gypsum were mixed with respect to 0.5 wt % of a retardant. For all of the mixtures, coagulation tests were carried out, hydrothermal characteristics, strength characteristics by ages, and length changes were analyzed, and XRD analysis of hydrates and SEM analysis were carried out.

FIG. 11 illustrates graphs representing coagulation characteristics of rapidly-cooled steelmaking reduced slag fine powder using a retardant, according to the present invention, FIG. 12 illustrates graphs representing coagulation characteristics a hydraulic binder composition according to the present invention, FIG. 13 illustrates hydrothermal graphs of a hydraulic binder composition according to the present invention, FIG. 14 illustrates hydration heat, which is accumulated over 48 hours, of a hydraulic binder composition according to the present invention, FIG. 15 illustrates graphs representing strength characteristics of a hydraulic binder composition according to the present invention, FIG. 16 illustrates graphs representing length changes of a hydraulic binder composition according to the present invention, FIG. 17 illustrates XRD graphs representing a mineral composition of a hardened body of a hydraulic binder composition according to the present invention, and FIG. 18 illustrates SEM images of a hardened body of a hydraulic binder composition according to the present invention.

As shown in FIG. 11, it was impossible to work with rapidly-cooled steelmaking reduced slag which does not contain a retardant, and liquidity was satisfactory when the retardant was added in an amount of 0.2 to 0.6 wt % thereto. Accordingly, in the present invention, a working time of approximately 30 minutes is secured when the retardant is added in an amount of 0.5 wt % thereto and workability is thus satisfactory. According to a required working time, an amount of the retardant may be changed. However, when the retardant is used in an amount of 2% or more, properties of hardened bodies may be affected.

As shown in FIG. 11, it can be confirmed that, when 0 to 0.6 wt % of the retardant is added to the rapidly-cooled steelmaking reduced slag, initial setting and final setting times are not nearly distinguished in the rapidly-cooled steelmaking reduced slag, the retardant is not added to which, and, according to increase of a retardant addition amount, coagulation delay effects increase. As shown in FIG. 12, it can be confirmed that initial delay effects occurred by mixing gypsum are maintained for approximately 2 minutes. However, it can be confirmed that, when a retardant is used in an amount of 0.5% with respect to an amount of the binder, initial and final setting are carried out within 30 minutes in a test in which gypsum is not used but a working time of approximately an hour and a half hour is secured in a test in which a retardant and gypsum are used.

As shown in FIG. 13, it can be confirmed that rapid reaction occurs within 2 hours and hydration heat elevates up to 100 when the rapidly-cooled steelmaking reduced slag fine powder is used alone without gypsum, but hydration heat is reduced to 30 or more and a hydration heat peak of approximately 70 is exhibited when gypsum is mixed in an amount of 20 to 30%. When an amount of gypsum mixed increases to 40%, hydration heat is more reduced and a maximum peak curve is gentler. Accordingly, it can be confirmed that cracks and strength reduction due to initial high hydration heat are reduced.

FIG. 14 illustrates temperatures accumulated for initial 48 hours of the rapidly-cooled steelmaking reduced slag fine powder. As shown in FIG. 13, when gypsum is mixed, initial high hydration heat due to only the rapidly-cooled steelmaking reduced slag fine powder is dramatically reduced. However, as shown in FIG. 14, initial hydration heat peak is lowered when gypsum is added but final heat generated for 48 hours is much higher when gypsum is mixed in an amount of 30%. Therefore, initial high hydration peak is gently reduced and a possibility of shrinkage and expansion is thus reduced. Accordingly, initial reactivity increases and strength may be thus improved.

As shown in FIG. 15, it can be confirmed that initial strength is 19.2 MPa when gypsum is mixed in an amount of 30% whereas the initial strength is 4.2 MPa when gypsum is not mixed, indicating that initial strength increases by adding gypsum to the rapidly-cooled steelmaking reduced slag fine powder. In addition, the slag containing gypsum exhibits hydration activity of 129% with respect to OPC at a material age of 28 days. The hydration activity is much higher than hydration activity, namely, 66%, of the slag to which gypsum is not added. In addition, the slag containing gypsum exhibits higher strength than RSC at a material age of 28 days.

As shown in FIG. 16, it can be confirmed that length changes are greatest when gypsum is not mixed and length changes are stabilized in proportion to an addition amount of gypsum. Due to addition of gypsum, swelling ettringite is generated and shrinkage compensation effects thus appear, thereby providing volume stability.

As shown in the XRD analysis results of the hydrates in FIG. 17, it can be confirmed that an ultra quick-hardening material, mayenite ($C_{12}A_7$, $12CaO.Al_2O_3$), and a CAH hydrate are observed at initial 10 minutes when gypsum is not mixed, but lots of ettringite is detected from initial 10 minutes when calcined gypsum is mixed in an amount of 30 wt %, thereby contributing to strength improvement.

As shown in the SEM analysis results of the hydrates in FIG. 18, it can be confirmed that CAH hydrate particles are observed within initial 10 minutes of a hydration reaction when the rapidly-cooled steelmaking reduced slag fine powder is used alone, and the CAH hydrate particles binds to surfaces of unhydrated particles and thus hinders long-term hydration reaction. However, when calcined gypsum is mixed in an amount of 30 wt %, ettringite is significantly observed within initial 10 minutes of a reaction 10, and ettringite grows and corporate bodies are extremely condensed with increasing a material age.

As described above, it can be confirmed that, when the retardant and the gypsum are mixed with the rapidly-cooled steelmaking reduced slag powder according to the present invention, coagulation is delayed and hydration heat is reduced due to use of the retardant and the gypsum. In addition, lots of ettringite is generated within initial several minutes and strength expression effects in an initial and long-term material age are superior, when compared to OPC. Accordingly, the hydraulic binder composition using the rapidly-cooled steelmaking reduced slag powder according to the present invention may be effectively used as a substitute for OPC.

The present invention may secure workability by delaying high hydration heat reaction and initial coagulation of rapidly-cooled steelmaking reduced slag powder (RC-LFS powder), enable to utilize the rapidly-cooled steelmaking reduced slag powder (RC-LFS powder) in a variety of fields requiring quick-hardening characteristics by providing initial and long-term strength expression, and substitute for cement or OPC cement having rapid-setting properties, thus having industrial applicability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a hydraulic binder composition for use as a substitute of ordinary Portland cement (OPC) by utilizing steelmaking reduction slag as starting material to produce the hydraulic binder composition, the method comprising:
  rapidly-cooling a steelmaking reduction slag from a temperature of 1,300-1,400° C. to 400-600° C. by spraying and scattering pressurized gas onto the steelmaking reduction slag for 5 to 10 seconds;
  pulverizing or comminuting the cooled steelmaking reduction slag into steelmaking reduction slag powder with a fineness of 3,000 cm$^2$/g or higher;
  adding gypsum to the steelmaking reduction slag powder to delay coagulation occurring when the cooled steelmaking reduction slag powder reacts with water, improve initial and long-term strength, and reduce shrinkage, in a weight ratio between the steelmaking reduction slag powder and the gypsum from 60:40 to 90:10, wherein the gypsum is selected from the group consisting of anhydrous gypsum, calcined gypsum, and dihydrate gypsum; and
  adding a retardant to the mixture of the steelmaking reduction slag powder and the gypsum to delay coagulation occurring when the steelmaking reduction slag powder reacts with water, in a weight ratio between the steelmaking reduction slag powder and the retardant being from 100:0.1 to 100:2, wherein the retardant is selected from the group consisting of citric acid powder and tartaric acid powder,
  wherein the steelmaking reduction slag powder includes 40 to 60 wt % of CaO, 5 to 20 wt % of SiO$_2$, 10 to 35 wt % of Al$_2$O$_3$, such that the amount of alumina (Al$_2$O$_3$), which facilitates hardening and improves early-strength properties, corrosion resistance, and fire resistance, is 2 to 7 times higher than ordinary Portland cement (OPC) with respect to wt %, and the steelmaking reduction slag powder further includes an amount of magnesia (MgO, Periclase), which facilitates hardening, improves strength, and prevents cracks, that is 2 to 3 times higher than ordinary Portland cement (OPC) with respect to wt %.

* * * * *